(12) United States Patent
Webster

(10) Patent No.: US 10,838,677 B1
(45) Date of Patent: Nov. 17, 2020

(54) DEVICE-LAYOUT DETERMINATIONS

(71) Applicant: Amazon Technologies, Inc., Seattle, WA (US)

(72) Inventor: Roger Robert Webster, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/714,351

(22) Filed: Sep. 25, 2017

Related U.S. Application Data

(63) Continuation of application No. 15/082,994, filed on Mar. 28, 2016, now Pat. No. 9,772,812.

(51) Int. Cl.
| | |
|---|---|
| *G06T 7/10* | (2017.01) |
| *G06F 3/14* | (2006.01) |
| *G06T 7/90* | (2017.01) |
| *G06K 9/46* | (2006.01) |
| *G06F 3/16* | (2006.01) |
| *G06K 9/00* | (2006.01) |
| *G06T 7/60* | (2017.01) |

(52) U.S. Cl.
CPC .............. *G06F 3/1423* (2013.01); *G06F 3/16* (2013.01); *G06K 9/00671* (2013.01); *G06K 9/4604* (2013.01); *G06T 7/10* (2017.01); *G06T 7/60* (2013.01); *G06T 7/90* (2017.01); *G06K 2209/01* (2013.01); *G06K 2209/03* (2013.01)

(58) Field of Classification Search
CPC ...... G06Q 30/00; G08B 21/22; G08B 25/008; G08B 25/14; G08B 5/221; G06T 7/10
See application file for complete search history.

(56) References Cited

U.S. PATENT DOCUMENTS

| | | | | |
|---|---|---|---|---|
| 7,693,757 | B2 * | 4/2010 | Zimmerman | G06Q 10/00 235/462.11 |
| 8,107,736 | B2 * | 1/2012 | Brown | G06Q 10/087 382/190 |
| 8,461,725 | B1 * | 6/2013 | Stubbs | H01H 9/54 307/140 |
| 8,622,284 | B1 * | 1/2014 | Hansen | G06Q 10/08 235/375 |
| 8,719,001 | B1 * | 5/2014 | Izdepski | G06F 8/61 703/22 |
| 8,743,145 | B1 | 6/2014 | Price | |
| 9,398,413 | B1 * | 7/2016 | Scalise | H04W 4/023 |
| 9,607,315 | B1 | 3/2017 | Worley, III | |
| 9,645,914 | B1 * | 5/2017 | Zhang | G06F 8/65 |
| 9,766,645 | B2 * | 9/2017 | Imes | F24F 11/63 |
| 10,235,150 | B2 * | 3/2019 | Peng | G06F 8/65 |

(Continued)

OTHER PUBLICATIONS

Chris Csik "Junkyard Jumbotron", retrieved on Sep. 8, 2016 at <<http://c4fcm.github.io/Junkyard-Jumbotron/>>, 2 pages.

(Continued)

*Primary Examiner* — Olga V Merkoulova
(74) *Attorney, Agent, or Firm* — Lee & Hayes, P.C.

(57) ABSTRACT

This application describes techniques for determining a constituency and a layout of a group of devices within an environment. By determining the devices that form the group, as well as the positions of these devices relative to one another, the group of devices may be used to more intelligently output content within the environment.

20 Claims, 11 Drawing Sheets

(56) References Cited

U.S. PATENT DOCUMENTS

| | | | | |
|---|---|---|---|---|
| 2008/0077511 | A1* | 3/2008 | Zimmerman | G06Q 10/00 |
| | | | | 705/28 |
| 2008/0094588 | A1* | 4/2008 | Cole | G03B 17/48 |
| | | | | 353/122 |
| 2008/0211825 | A1* | 9/2008 | Sunakawa | G06F 3/1446 |
| | | | | 345/581 |
| 2008/0301175 | A1 | 12/2008 | Applebaum et al. | |
| 2010/0008584 | A1* | 1/2010 | Brown | G06Q 10/087 |
| | | | | 382/190 |
| 2010/0228632 | A1 | 9/2010 | Rodriguez | |
| 2011/0098056 | A1 | 4/2011 | Rhoads et al. | |
| 2011/0161912 | A1 | 6/2011 | Eteminan et al. | |
| 2011/0289308 | A1 | 11/2011 | Sobko et al. | |
| 2014/0125649 | A1 | 5/2014 | Carlin | |
| 2014/0293017 | A1* | 10/2014 | Fei | G09F 9/3026 |
| | | | | 348/51 |
| 2014/0302773 | A1* | 10/2014 | Jantunen | H04W 8/005 |
| | | | | 455/3.01 |
| 2014/0304689 | A1* | 10/2014 | San Jose | G06F 8/71 |
| | | | | 717/134 |
| 2016/0162276 | A1* | 6/2016 | Peng | G06F 8/65 |
| | | | | 715/744 |
| 2016/0188181 | A1* | 6/2016 | Smith | G06F 3/016 |
| | | | | 715/765 |

OTHER PUBLICATIONS

"How to Transform Multiple Small Screens Into One Giant Display", retrieved on Jan. 23, 2020, at <<https://www.businessinsider.com/how-to-transform-multiple-screens-into-one-big-virtual-display-2011-3>>, Business Insider, 2020, 3 pages.

Mansur, Robin, "How to Transform Multiple Screens into One Big Virtual Display", retrieved on Jan. 23, 2020, at <<https://odd-gadgets.wonderhowto.com/how-to/transform-multiple-screens-into-one-big-virtual-display-0125989/>>, WonderHowTo, Mar. 2011, 4 pages.

* cited by examiner

US 10,838,677 B1

DEVICE-LAYOUT DETERMINATIONS

RELATED APPLICATIONS

This application claims priority to and is a continuation of U.S. patent application Ser. No. 15/082,994, filed on Mar. 28, 2016, the entire contents of which are incorporated herein by reference.

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through natural language input such as speech input and gestures.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 illustrates the example group of devices shown in FIG. 1A. In this example, the group may include one or more display devices, one or more speakers, one or more cameras, one or more physical knobs, and the like.

FIG. 3 illustrates the example device group when in a configuration mode. When in the configuration mode, the display devices of the group may each display respective unique visual indicia that, when captured in the image provided to the device controller, allows the device controller to identify the devices. In this example, the device controller has instructed the display devices to display unique alphanumeric strings (in this case, individual numbers) as well as a border around the perimeters of the displays. The device controller may use this information to identify the devices, determine their display sizes, determine their layout relative to one another, and the like.

FIG. 4 illustrates another example of the example device group in the configuration mode. In this example, the display devices display unique patterns, which the device controller may use to identify the devices and other information regarding these devices, such as display size, and the like.

DETAILED DESCRIPTION

Figure 1A:
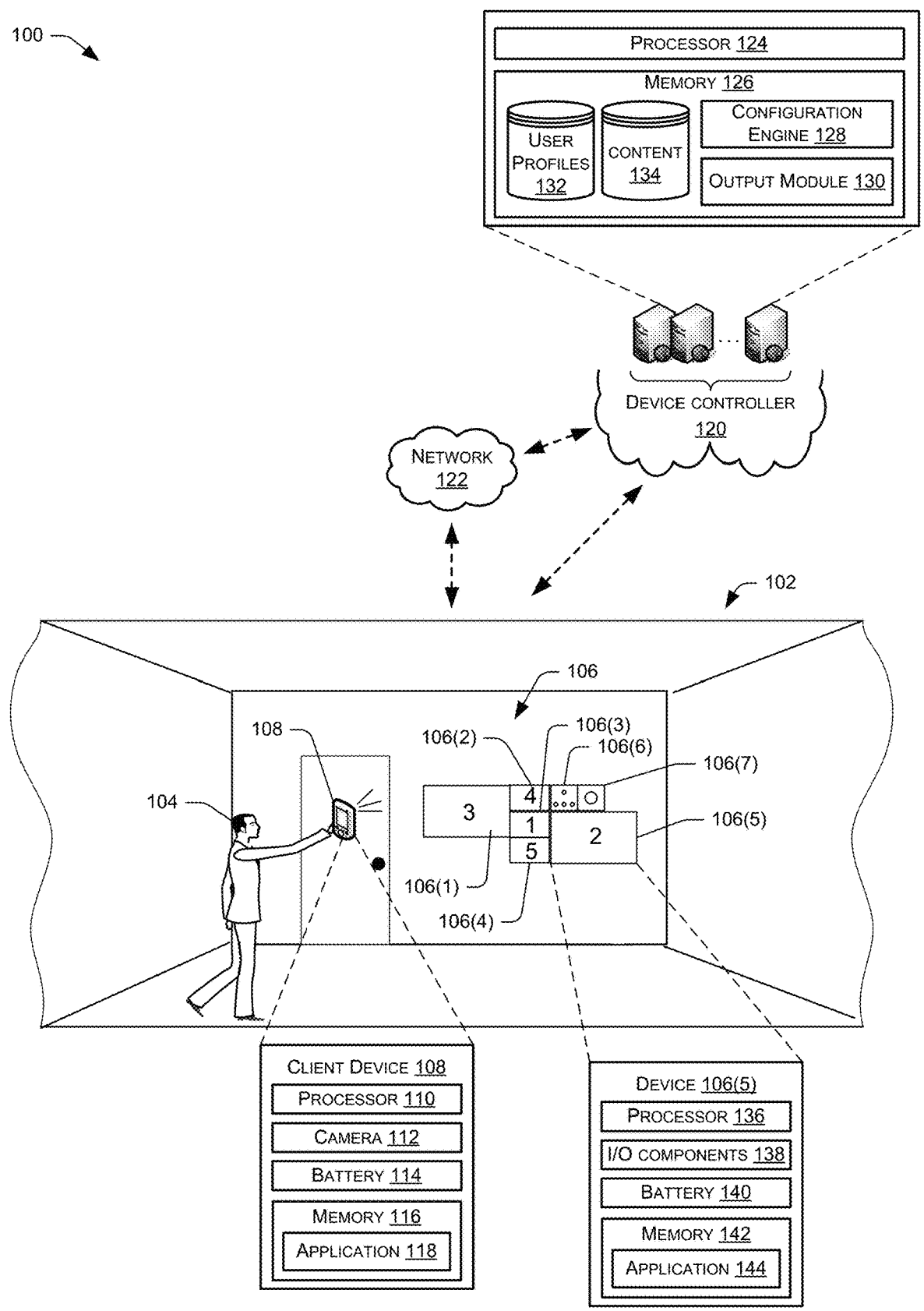
FIG. 1A is a schematic diagram of an illustrative environment that includes a group of devices having an array of functionality mounted on a wall within the environment. In this example, a user captures an image of the group and provides this image to a device controller, which identifies devices within the group as well as layout of the devices relative to one another. With this information, the device controller is able to more intelligently output different types of content within the environment using the devices of the group.

Techniques for determining a constituency and a layout of a group of devices within an environment are described herein. By determining the devices that form the group, as well as the positions of these devices relative to one another, the group of devices may be used to more intelligently output content within the environment.

Some environments, such as a houses, offices, schools, retail spaces, and the like may include groups of devices that are adjacent one another. For instance, a home of a user may include a first wall in a living room of the home upon which a first group of devices mounts, and a second wall in a bedroom of the home in which a second group of devices mounts. In some instances, the groups of devices receive power from alternating current (AC) power plugs also mounted in the respective walls. Further, the devices of the groups may include display devices (e.g., LCD displays, LED displays, electronic-paper displays, projectors, etc.), physical knobs or switches (e.g., light switches, dimmer switches, etc.), cameras, speakers, microphones, or any other type of device.

The example user may then utilize these devices for an array of purposes. For instance, the display devices within the respective groups may be used to output video content or still content, while the speakers may be used to output audio content, such as music or the like. The cameras, meanwhile, may be used to participate in video call while the microphones may be used to participate in voice or video calls, potentially along with providing voice commands to operate the group of devices or to request, via voice, to perform other operations within the environment or other environments.

In some instances, a device controller may control usage of the example device groups. For instance, the device controller may receive requests to utilize one or more devices of a particular group and may provide corresponding instructions to the devices. In some instances, the device controller comprises hardware and software that resides locally within an environment of the device group (e.g., within the home of the example user), while in other instances the device controller resides remotely from the environment (e.g., "in the cloud"). In the former instances, the device controller may still communicate with remote services for performing speech recognition on generated audio signals, receiving and providing content for output on the devices, and the like. Further, the user may interact with the device controller in any number of ways, such as via voice commands, commands issued using a graphical user interface (GUI) executing on an application of a client device of the user, or the like. In some instances, the client device of the user includes a "companion application" that is specifically designed, in part, to allow the user to interact with the device group.

In some instances, the device controller may use information regarding the devices to determine how best to output content within the environment. For instance, when a user requests to display video content when in the living room, the device controller may determine which one or more devices are within or nearest the living room and may send one or more instructions to these devices to display the content. In some instances, if two or more display devices are adjacent one another and form, at least in part, a suitable shape (e.g., a rectangle), the device controller may utilize the two or more adjacent displays as a single display.

For instance, envision that a first example group of devices in the living room includes two rectangular displays adjacent one another and collectively forming a larger rectangle. In response to a user issuing a voice command or a GUI-based command to present a movie in the living room, the device controller may determine to use the two displays a single display. As such, the device controller may send a first instruction to the first display device to present a first portion of the movie and a second instruction to the second display device to present a second portion of the movie. As such, the user is able to watch the movie on a display device that is collectively larger than either of the individual display devices of the group of devices. Further, the device controller may also determine how best to utilize the speakers of the group of devices. For instance, the device controller may determine that the example group of devices includes the speakers forming a portion of the individual display devices as well as dedicated speakers that are free from displays. In some instances, the device controller may utilize each of these audio components to output audio of the movie. For instance, the device controller may determine, from the layout, the position of the available speakers relative to the display(s) being used and/or relative to the user and may use this information to direct the audio signals. For instance, the device controller may direct the audio signals associated with a left channel to a first speaker device while directing the audio signals associated with a right channel to a second speaker device, and so forth.

In order to utilize the group of devices in this intelligent manner, however, the device controller first learns both the constituency and layout of the devices of the group. That is, in order to intelligently utilize the two display devices as the single display and to utilize each speaker of the group, the device controller is to first identify which devices form the group and positions of these devices relative to one another (potentially along with a position of the group itself within the larger home environment). In some instances, the device controller may identify which devices are display devices, and may only determine the positions of these display devices within the group, rather than each device of the group (e.g., speakers, cameras, etc.).

In some instances described herein, a device within the environment provides one or more images of the environment, including the group of devices, to the device controller. The device controller may then perform image recognition on the image to identify the devices within the example group as well as the positions of the devices of the group relative to one another (i.e., the layout of the group of devices). In some instances, the device that captures the image comprises a client device operated by a user, while in other instances a camera of the group or of another group of devices within the environment (e.g., a home-security camera, etc.) captures the image and provides the image to the device controller.

In the former instances, the companion application executing on the client device may instruct the user (e.g., via the GUI, an audio command, etc.) to capture an image of the group of devices. After capturing the image, the client device (e.g., a mobile phone of the user, a tablet computing device of the user, etc.) may then provide the image to the device controller. The device controller may then analyze the captured image (or multiple images) to identify the devices and the layout. To do so, the device controller may identify visual indicia associated with each of the devices and may associate with unique visual indicia with the devices.

For instance, envision that the group of devices includes a first display device of a first make and model, a second display device of a second make and model, and a device comprising a camera/speaker/microphone array. The device controller may identify, from the image, first visual indicia comprising a brand and model provided on the first display device, potentially along with an estimated size of the display device, to identify that the first display device. For instance, the device controller may store or access information that maps known visual indicia (e.g., brand names, sizes, etc.) to known devices. The device controller may similarly identify unique visual indicia provided on the second display device to identify the second display device. Further, the device controller may perform image recognition on the portion of the image corresponding to the camera/speaker/microphone array to determine the unique layout of the cameras, speakers, and microphones to determine that this device comprises the array. Therefore, in some instances the device controller may use immutable visual characteristics of the devices to determine their respective identities, which may be used to determine information regarding the devices such as their respective capabilities, sizes, and the like.

In other instances, the devices of the group of devices may operate in a configuration mode, in which the devices present certain information to aid in identification. For instance, the user may initially utilize the companion application to initiate a request to configure the devices of the group. In some instances, the device controller receives this response. In response to receiving the configuration request, the device controller may send respective instructions to the respective display devices to display unique visual indicia. For instance, when the device controller receives a request to configure the example group described immediately above, the controller may send a first instruction to the first display device to display first visual indicia and may send a second instruction to the second display device to display second, different visual indicia. After the client device of the user then provides the image to the device controller, the device controller may then identify the first visual indicia within the image and the second visual indicia within the image to determine that these first and second display devices form a portion of the group that is currently being configured. Further, the device controller may use this information along with additional image-recognition techniques to determine sizes of the displays (if not already known) and positions of the display devices relative to each other and relative to other devices of the group.

In addition to instructing the devices to present the unique visual indicia, the device controller may additionally instruct the display devices to illuminate a border of the display devices. By doing so, the device controller is able to better determine a size of the display devices, which may aid both in identification of the devices and determination of the layout of the group of devices.

The visual indicia presented on the display devices may comprise any sort of visual indicia. For instance, the display devices may present arbitrary alphanumeric strings (as determined by and known to the device controller), alphanumeric information immutably associated with the display device (e.g., MAC addresses, UPC numbers, etc.), barcodes, shapes, patterns, objects or the like. For instance, the device controller may instruct a first device to present a particular pattern (e.g., an array of dots) while instructing a second device to present a second pattern (e.g., a grid pattern). In another example, the device controller may instruct the first device to present a particular object (e.g., an image of a tree) while instructing the second device to present a second object (e.g., an image of a dog). Of course, while a few examples have been described, it is to be appreciated that the display devices may present any other image that may be used to uniquely identify the devices.

Further, in addition or in the alternative to the device controller sending the instructions, in some instances the display devices themselves may be configured to present the unique visual indicia in a configuration mode. For instance, the first display device may be configured to present, on the display, its own MAC address when requested to do so, as may the second device. Upon the device controller receiving the image including both devices, this controller may identify the respective MAC addresses and may associate these MAC addresses with the particular display devices and may use image recognition to determine the layout of the devices relative to one another (potentially along with other devices, such as cameras, speakers, or the like).

In still other instances, the user may place the unique visual indicia on the devices. For instance, the companion application may instruct the user to place a first barcode sticker of a first number on a first device, a second barcode sticker of a second number on a second device, and so forth. After doing so, the user may then utilize the client device to capture the image of the group to provide the image to the device controller, which may then analyze the image to identify the respective barcodes to identity the devices and layout of the devices within the group. In still other instances, the display devices may include respective clear, protective sheets attached to the front of the device (e.g., on the front of the display), as placed by manufacturers or retailers. These protective sheets may include visual indicia (e.g., unique numbers) and the companion application may instruct the user to capture an image of the group of devices prior to removing the protective sheets from the devices. Of course, while a few examples have been described it is to be appreciated that any other visual indicia may be used to identify devices of a group.

After identifying devices associated with a particular group, the device controller may store an indication that the particular group includes the identified devices. In addition, the device controller may store an indication of the positions of the devices relative to one another. Further, the controller may identify, for groups that include multiple display devices, when any of the display devices may later be utilized as a single display. For instance, the device controller may determine whether a larger rectangular display area can be formed from individual rectangular displays, although other shapes may be utilized. In some instances, the device controller determines, from the image, whether a contiguous rectangular area can be formed from display devices that are adjacent one another. If so, the device controller may store an indication that these devices may be later used as a single display.

After the device controller learns of the devices and layout of the group, the user may utilize the devices of the group for outputting content. For instance, a user may issue a voice command to "play the movie Field of Dreams in the living room". In response to a microphone proximate to the user generating an audio signal that includes this voice command and providing the audio signal to the device controller (or other entity able to perform voice recognition), the device controller may perform automatic speech recognition (ASR) on the signal to identify the command. The device controller may then determine which devices form a portion of the group of devices associated with the living room of the user and, within this devices, may determine the largest display area that may be utilized as a single display. In some instances, the device controller may determine that two or more devices may be utilized to output the visual content of the requested movie and may send instructions to these devices to cooperatively output the movie. In addition, the speakers of the group of devices within the living room (and/or another group of devices within the house of the user) may be used to output audio of the movie.

Further, given that groups of devices are user-defined, a user may choose to add devices to or remove devices from a group over time. For instance, a user may take a display device from a group of devices in the bedroom and add the display device to the group of devices in the living room. Or, the user may acquire a new device and may add this device to the living-room group. In still other instances, the user may simply rearrange the layout of the devices within the group. In these instances, the techniques described above may be reapplied. That is, the devices may again enter the configuration mode in which they display respective unique visual indicia, and an image may be provided to the device controller for updating the constituency and/or layout of the group. In some instances, a user may trigger this update utilizing the companion application or using the devices themselves. In other instances, one or more devices of the group may sense that one or more short-range wireless communication signals have changed and may trigger the update. For instance, a first display device may sense, over Bluetooth, Zigbee, or the like, that a second display device not previously detected is proximate to the first display device and, in response, may trigger the update. In still other instances, a camera within the environment may periodically capture and send images to the device controller for performing image recognition thereon to update the constituency and/or layout of the group if necessary.

FIG. 1A is a schematic diagram of an illustrative environment 100 illustrating a home environment 102 of a user 104 that includes a group of devices 106. The group of devices 106 has an array of functionality mounted on a wall within the home environment 102. For instance, in this example the group 106 includes a first display device 106(1), a second display device 106(2), a third display device 106(3), a fourth display device 106(4), a fifth display device 106(5), a voice-controlled device (e.g., a speaker/microphone array) 106(6), and a physical knob 106(7). While a few example devices are shown, it is to be appreciated that the group 106 may include any other type of device.

In this example, the user 104 captures an image of the group 106 using a client device 108 of the user for the purpose of configuring the group 106 for use, as described in detail below. As illustrated, the client device 108 includes one or more processors 110, a camera 112, a battery 114 (or other power source), and memory 116, which stores an application 118. The memory 116, as well as each memory described herein, may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 116 may be implemented as computer-readable storage media ("CRSM"), which may be any available physical media accessible by the processor(s) 110 to execute instructions stored on the memory 116. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 110.

In some instances, the application 118 instructs the user 104 to capture the image (or multiple images, a video, etc.) and then provides the captured image(s) to a device controller 120. In some instances, the device controller 120 resides within the home environment 102 while in other instances the device controller 120 resides remotely from the home environment 102 and is accessible over a network 122. The network 122 may represent an array or wired networks, wireless networks (e.g., WiFi), or combinations thereof. In some instances, the device controller 120 is a network-accessible platform—or "cloud-based service"—implemented as a computing infrastructure of processors, storage, software, data access, and so forth that is maintained and accessible via the network 116, such as the Internet. Cloud-based services may not require end-user knowledge of the physical location and configuration of the system that delivers the services. Common expressions associated with cloud-based services, such as the remote service 112, include "on-demand computing", "software as a service (SaaS)", "platform computing", "network accessible platform", and so forth.

As illustrated, the device controller 120 may comprise one or more network-accessible resources, such as servers. These resources comprise one or more processors 124 and memory 126 executable on the processors 124. The computer-readable media 122 may store a configuration engine 128, an output module 130, a user-profile datastore 132, and a content datastore 134. The configuration engine 128 may receive the image of the group 106 and determine the constituency and layout of the group, as described in further detail with reference to FIGS. 3-10. The output module 130, meanwhile, may function to output content on the group of devices 106 after the group has been configured. With the information regarding the constituency and layout of the group 106, the output module 130 is able to more intelligently output different types of content within the environment 102. It is to be appreciated that while FIG. 1A illustrates a single group 106, the home environment 102 may include one or more additional groups within the same illustrated room or one or more different rooms.

To configure the group of devices 106, the configuration engine 128 may initially receive a configuration request from the user 104 via the application 118. In response to receiving the request, the configuration engine 128 may use identifying information accompanying the request to determine a user profile associated with the user 104. For instance, the user 104 may have signed in with (i.e., authenticated with) the application 118 on the device 106 before sending the request, enabling the configuration engine 128 to map the request a particular user profile within the user-profile datastore 132. In other instances, the configuration engine 128 may identify the user via an identifier of the device 106, a username of the user 106, or any other identifying information.

After receiving the configuration request and identifying the user profile corresponding to the user 104, the configuration engine may determine, from the user profile, devices associated with the profile of the user 104. In some instances, devices associated with the user profile may be comprise devices directly purchased or obtained by the user 104, as well as those devices purchased or obtained by other users associated with the environment. For instance, if multiple users (e.g., husband, wife, children, etc.) have user profiles that are associated with a common address corresponding to the environment 102, then each device associated with these profiles (and, hence, this environment 102) may be determined to be associated with the user profile of the user 104. In other words, each time the user 104 or another user associated with the environment acquires a device, the user may associate the device with a profile of the user. Therefore, when the configuration engine 128 receives the configuration request, it may identify each device associated with the particular profile. After doing so, the configuration engine 128 may then send an instruction to each display device of the devices to present respectively unique visual indicia on the display. For instance, the configuration engine 128 may send a first instruction to a first device to present first visual indicia, a second instruction to a second device to present a second visual indicia, and so forth. As described above, the visual indicia may comprise alphanumeric strings, identifiers previously associated with the devices (e.g., MAC addresses, etc.), patterns, objects, colored borders, or the like. In other instances, meanwhile, the user may adhere identifiers to the devices (e.g., barcodes) or the like.

After the devices display the unique visual indicia, the application 118 may instruct the user 104 to capture the image, which is then provided to the device controller 120. In response to receiving the image, the device controller 120 then performs image recognition on the image to identify any of the visual indicia depicted therein. As the reader will appreciate, the image will depict the visual indicia associated with the devices that are present within the particular group 106 but not the visual indicia associated with devices of the user 104 that are not in the group 106. That is, because the device controller 120 may send an instruction to each device associated with the profile of the user 104, some of these devices may be currently presenting their respective visual indicia outside of the illustrated environment 102. As such, these visual indicia will not appear in the image.

After identifying the visual indicia in the image, the device controller 120 may associate (or "map") these visual indicia with the respective devices. In this example, the device controller 120 may determine that the group 106 includes the five display devices 106(1)-(5), the voice-controlled device 106(6), and the physical knob 106(7). The device controller may then store, in association with the profile in the datastore 132, an indication of the group 106 and the devices of the group.

In addition, the device controller 120 may utilize the image-recognition techniques to determine additional information associated with the devices of the group 106. For instance, the device controller 120 may determine one or more capabilities of each device (e.g., display visual content, output audible content, generate audio signals, generate video signals, etc.), a size of each device, a position of each device, etc. In some instances, the device controller 120 determines a position of each device relative to one another and stores an indication of this layout of the group 106 in the profile of the user 104, potentially as well as in profiles of other users associated with the environment 102. Further, the device controller 120 may utilize this known geometry and sizes to identify any combinations of multiple devices that may be used as a single display device.

After storing this in the profile, the device controller 120 may later receive a request to output content within the environment 102. In some instances, the device controller 120 may receive this request via the companion application 118. In other instances, the controller 120 may receive the request based on a voice command from the user 104. In these instances, a voice-controlled device of the group (e.g., the voice-controlled device 106(6)) is configured to identify a predefined "wake word" (i.e., a predefined utterance). Upon identifying the wake word, the device 106(6) may begin uploading an audio signal generated by the device to the device controller 120 or other remote servers having a speech-recognition module thereon. In response to receiving this audio signal, the speech-recognition module may begin performing automated speech recognition (ASR) on the audio signal to generate text and identify one or more user voice commands from the generated text.

In response to receiving a request to output content within the environment 102, the device controller 120 may determine how to utilize the devices of the group 106. For instance, if the requested content comprises visual content, the controller 120 may determine to utilize multiple devices as a single display and may send respective instructions to the display devices to display different portions of the content. Similarly, the device controller 120 may utilize the cameras, speakers, microphones, and the like as needed.

FIG. 1A further illustrates a few example components of an example device, device 106(5), that may form a portion of the group 106. As illustrated, the device 106(5) may include a processor 136, one or more input/output (I/O) components 138, a battery (or other power source) 140, memory 142, and, potentially, one or more applications 144 (e.g., for communicating with the device controller 118). The I/O components 138 may comprise any of the components described above, such as displays, speakers, microphones, cameras, or the like. Further, the process 136, as well as each processor described herein, may comprise one or more processors located in a same or different location/position.

Figure 1B:
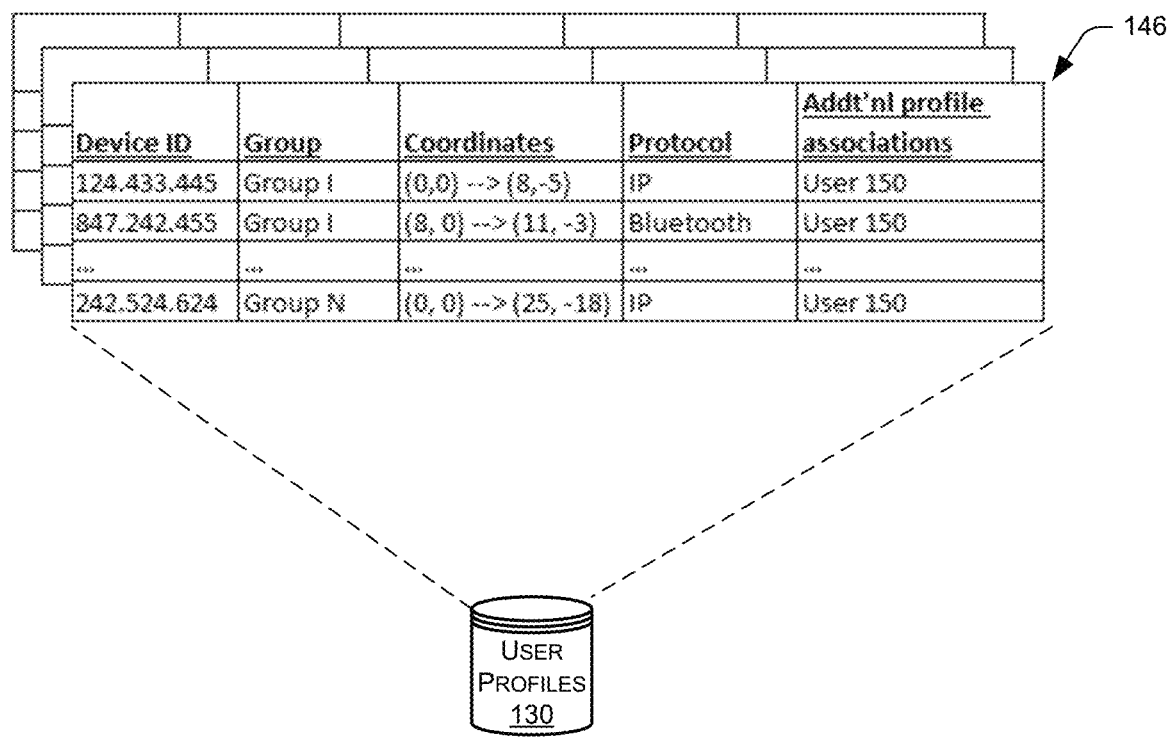
FIG. 1B illustrates an example data structure that may indicate constituency and layout of devices within groups associated with a user profile, such as with a profile of the example user of FIG. 1A.

FIG. 1B illustrates an example data structure 146 that may indicate constituency and layout of devices within groups associated with a user profile, such as with a profile of the example user 104. The data structure 146 may reside in the user-profile datastore 132 of the device controller 120, which, as described above, may reside within the environment 102 of the user 104 or remote from the environment 102. As illustrated, the data structure 146 may indicate one or more devices that are associated with the respective profile, a group that each of the devices is associated with, respective coordinates of each of the devices within its respective group, a respective protocol used to communicate with the particular device, and other user profiles that are also associated with the respective device. While the data structure 146 illustrates a few example details that the device controller 120 or other entity may store, it is to be appreciated that additional or different details may be stored in other instances.

The data structure 146 may identify each device associated with a profile in any number of ways. For instance, the structure 146 may list each device associated with the profile according to its MAC address, IP address, or other device identifier (DID). Further, the data structure 146 may indicate which one or more groups each device has been associated with. For instance, in the illustrated example, the first listed device has been associated with the first group of the user 104 illustrated in FIG. 1A. Of course, in some instances a particular device may be associated with (i.e., may form a portion of) multiple groups.

The data structure 146 may store a layout of each of the groups in any number of ways. In the illustrated example, the data structure 146 stores coordinates of each device in each group it is part of. To do so, in one example a top-left corner of the device of a group that is furthest to the left side of the group may be deemed (0, 0) in an X-Y coordinate system. When the device controller 120 determines the size of the device, it may store an indication of other coordinates (relative to the defined coordinate system) that the device occupies as part of the group. In this example, the first listed device is determined to occupy coordinates between its top-left corner of (0, 0) and its bottom-right corner of (8, −5). The next device of group I, meanwhile, occupies coordinates between a top-left corner of (8, 0) and a bottom-right corner of (11, −3). Of course, while one example is described, the relative positions of devices (i.e., layout) within a group may be stored in any other manner.

The data structure 146 further stores one or more communication protocols that may be used to communicate with each of the listed devices. The communication protocols may comprise IP-based protocols, short-range wireless communication protocols (e.g., Bluetooth, Zigbee, etc.) or the like. The device controller 120 may later reference these indications to determine how to send instructions to the listed devices.

Figure 2:
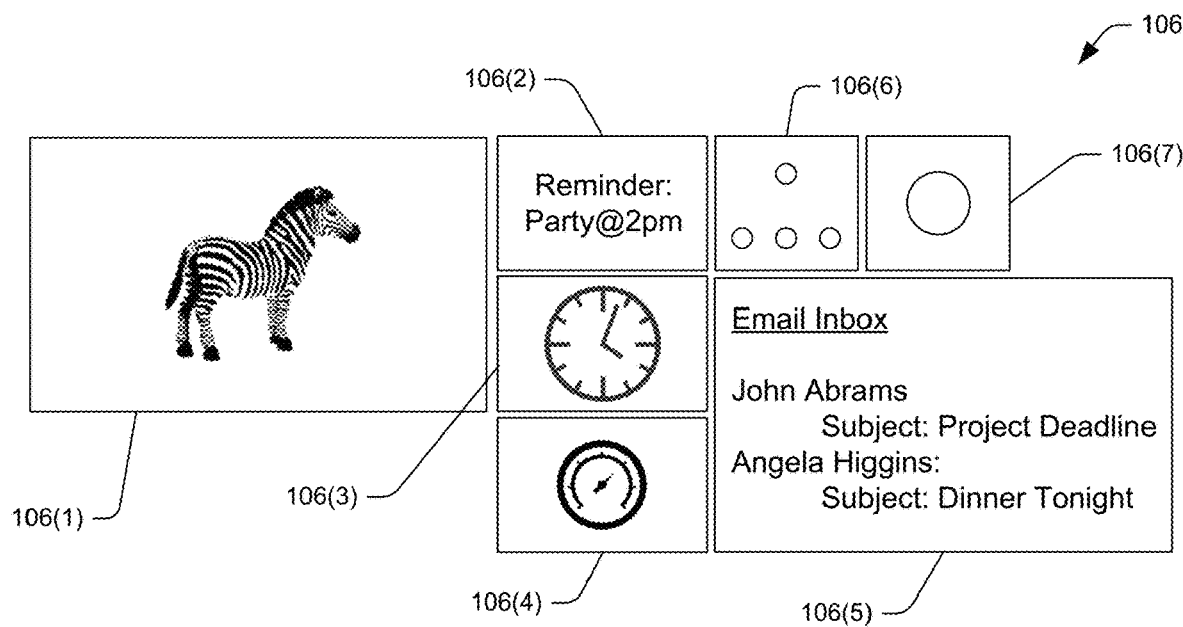

FIG. 2 illustrates the example group of devices 106 shown in FIG. 1A. In this example, the group 106 include the one or more display devices 106(1)-(5), the voice-controlled device 106(6), and the physical knob 106(7). In other instances, the group 106 or other groups may include one or more dedicated speakers, one or more dedicated cameras, different sensor arrays, and the like.

In the illustrated example, the first display device 106(1) currently presents image content, the second display device 106(2) presents calendar information associated with the user 104, the third display device 106(3) presents a clock, the fourth display device 106(4) presents a representation of a dial for controlling one or more appliances within the environment 102 (e.g., a thermostat, fan, etc.), and the sixth display device 106(6) presents an email application associated with the user 104. The voice-controlled device 106(6), meanwhile, comprises one or more microphones and speakers for receiving voice commands of a user and outputting audible content in response. Finally, the example group 106 includes a physical dial 106(7) that may be used to controlling one or more appliances within the environment (e.g., lights, a fan, etc.).

While the example group 106 presents several example devices, it is to be appreciated that the user 104 may "plug and play" one or more other devices within the group. That is, the user may add, remove, replace, or move devices into and out of the group. As described above, each device may receive power from alternating current (AC) power from a wall socket on which the group 106 resides. In some instances, however, the devices may additionally or alternatively provide their own power source. In either instance, the devices of the group 106 may be free from a physical connection between one another other than the connection to a common power source.

Figure 3:
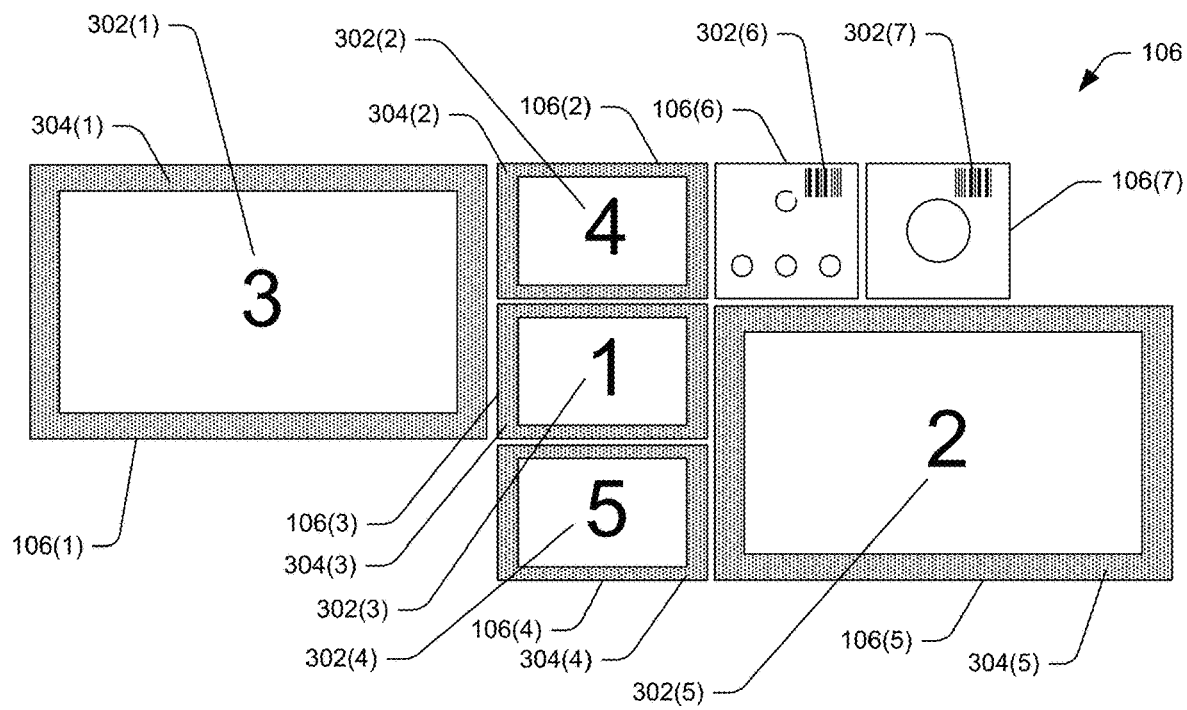

FIG. 3 illustrates the example device group 106 when in a configuration mode. When in the configuration mode, the display devices of the group 106 may each display respective unique visual indicia that, when captured in the image provided to the device controller 120, allows the device controller 120 to identify the devices. In this example, the device controller 120 has instructed each of the display devices 106(1)-(5) to display unique alphanumeric strings (in this case, individual numbers) as well as a border around the perimeters of the displays.

For instance, the first display device 106(1) has received an instruction to present an identifier 302(1) ("3") and a border 302(1). The second display device 106(2), meanwhile, has received an instruction to present an identifier 302(2) ("4") and a border 304(2), while the third display device 106(3) has received an instruction to present an identifier 302(3) ("1") and a border 304(3). Similarly, the fourth display device 106(4) has received an instruction to present an identifier 302(4) ("5") and a border 304(4) and the fifth display device 106(5) has received an instruction to present an identifier 302(5) ("2") and a border 304(5). Further, some display devices associated with the profile of the user 104 that are not illustrated and depicted within an uploaded image may have received instructions to present corresponding identifiers. That is, some of the devices associated with the profile of the user 104 may reside in other rooms of the environment 102 or in other environments completely (e.g., an office of the user) and, therefore, are not part of the group 106.

Upon receiving an image of the group 106 in the example configuration mode, the device controller 120 may use image recognition to identify the identifiers 302 for identifying the respective devices and their positions relative to one another. In some instances, after identifying the device, the device controller 120 may "look up" additional information regarding the devices in the profile or elsewhere, with this additional information comprising display sizes, resolution, capabilities, make/model, and the like. In other instances, meanwhile, the device controller 120 may utilize the borders 304 displayed around the perimeters of the display devices to determine the sizes of the display devices and to determine their layout relative to one another. For ease of discrimination between devices and to aid in the identification of the devices, the borders 304 may be of different colors.

To determine and store the layout of the group 106, the device controller 120 may assign a first location the first device 106(1) (e.g., having a top-left coordinate of (0,0)) and may assign positions to each other ones of the devices directly or indirectly relative to this first device 106(1). By doing so, the device controller 120 may be able to utilize two or more display devices as a single display in some instances. In the illustrated example, for instance, the device controller 120 may determine that the devices 106(1), 106 (2), and 106(3) are adjacent one another and form a rectangular area. As such, the device controller 120 may store an indication that these three displays may be utilized as a single display.

While the above example describes identifying devices by displaying unique visual indicia on the devices, the device controller 120 may additionally or alternatively identify the devices in other ways. For instance, the device controller 120 may be configured to identify the voice-controlled device 106(6) and the physical knob 106(7) from the uploaded image based on their physical appearances. That is, the device controller 120 may have been programmed to identify the voice-controlled device 106(6) based on the single microphone towards a top of the front face on the device and the three speakers spaced apart on a line towards a bottom of the front face of the device. Similarly, the device controller 120 may be programmed to identify the round nature of the physical dial 106(7). In still other instances, the device controller 120 may perform image recognition to identify text on the devices, such as a make, model or the like of the devices.

In the illustrated example, meanwhile, the voice-controlled device 106(6) includes an identifier 302(6) while the physical knob 106(7) includes an identifier 302(7). In this example, these identifiers comprise barcodes that uniquely identify these devices. In some instances, these devices include these identifiers upon acquisition by the user 104, while in other instances the application 118 instructs the user 104 to place these identifiers (e.g., via stickers that include the identifiers) to respective faces of the devices.

Figure 4:
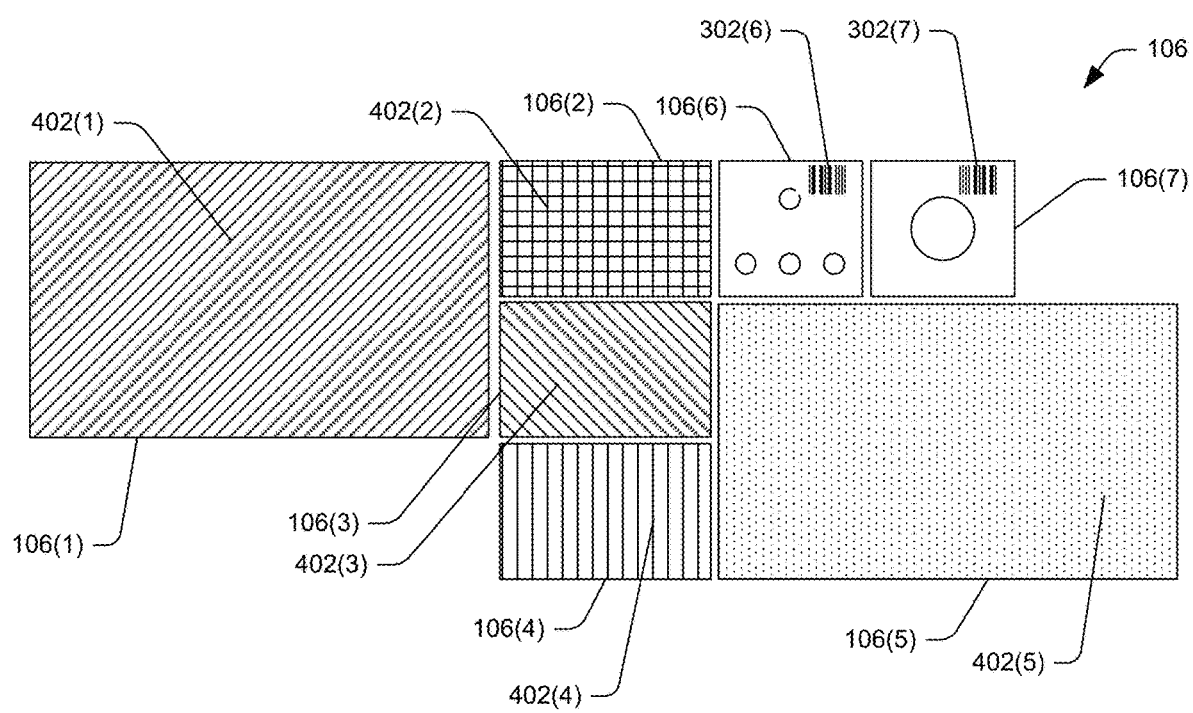

FIG. 4 illustrates another example of the example device group 106 in the configuration mode. In this example, the display devices display unique patterns for use in identifying the layout of the devices. For instance, in this example the device controller 120 instructs the first device 106(1) to present a first pattern 402(1) on its display, instructs the second device 106(2) to present a second pattern 402(2) on its display, instructs the third device 106(3) to present a third pattern 402(3) on its display, instructs the fourth device 106(4) to present a fourth pattern 402(4) on its display, and instructs the fifth device 106(5) to present a fifth pattern 402(5) on its display. After receiving a captured image that depicts the devices of the group, the device controller 120 may use the identified patters to identify the display devices, and may use the identifiers 302(6) and 302(7) to identify the devices 106(6) and 106(7), respectively. After identifying the devices of the group, the device controller 120 may determine a layout of the devices, sizes of the devices, and the like.

FIGS. 5A-D collectively illustrate an example flow diagram of a process 500 for configuring a group of devices for use within an environment by determining the identity and layout of the devices within the group. This process (as well as each process described herein) is illustrated as a logical flow graph, each operation of which represents a sequence of operations that can be implemented in hardware, software, or a combination thereof. In the context of software, the operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, the operations performed under the client device 108 may be performed by that device, and so forth.

At 502, the client device 108 sends a request to determine a layout of a group of devices within an environment. In some instances, the device comprises part of the group, while in other instances it does not. This request may comprise a request made via a GUI of the companion application described above, a voice command, or the like.

At 504, the device controller 120 receives the request and, at 506, determines a user profile associated with the request. That is, the device controller 120 may determine the identity of the user that sent the request (e.g., via an identifier of the client device, the user 104 being signed into the application 118, or the like). After identifying the profile of the user, at 508 the device controller 120 determines one or more devices associated with the profile of the user 104. As described above, devices associated with the profile of the user 104 may comprise those devices associated with the environment of the user 104 (e.g., devices associated with an address that is associated with the profile of the user 104). At 510, the device controller 120 sends a respective instruction to each of these devices that is a display device to present unique visual indicia on their respective displays. As described above, this may comprise alphanumeric strings, colored borders, barcodes, objects, patterns, or the like.

At 512, the devices associated with the profile of the user 104 may receive the instructions. As described above, because the device controller 120 is currently attempting to determine the constituency of the group, it is likely that some of the devices that receive the instructions are within the group but some are not. At 514, each display device displays its unique visual indicia as specified by the instruction. It is to be appreciated that "unique" visual indicia may be unique relative to each other indicia used by other devices associated with the profile (as in the examples where the devices present "1", "2", "3", etc.) or may be globally unique (as in the case where the devices present their MAC addresses).

Figure 5A:
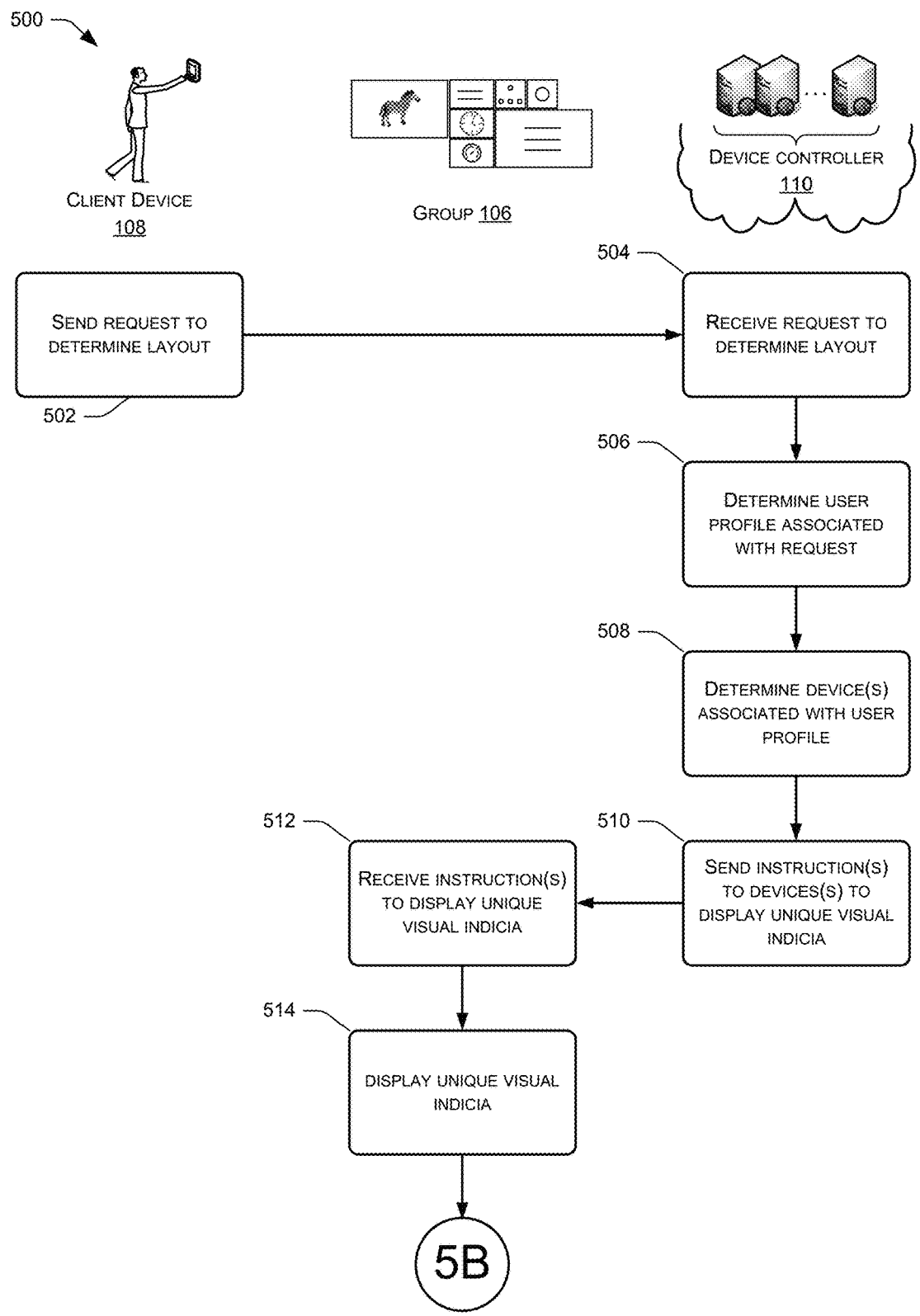
FIGS. 5A-D collectively illustrate an example flow diagram of a process for configuring a group of devices for use within an environment by determining the identity and layout of the devices within the group.
Figure 5B:
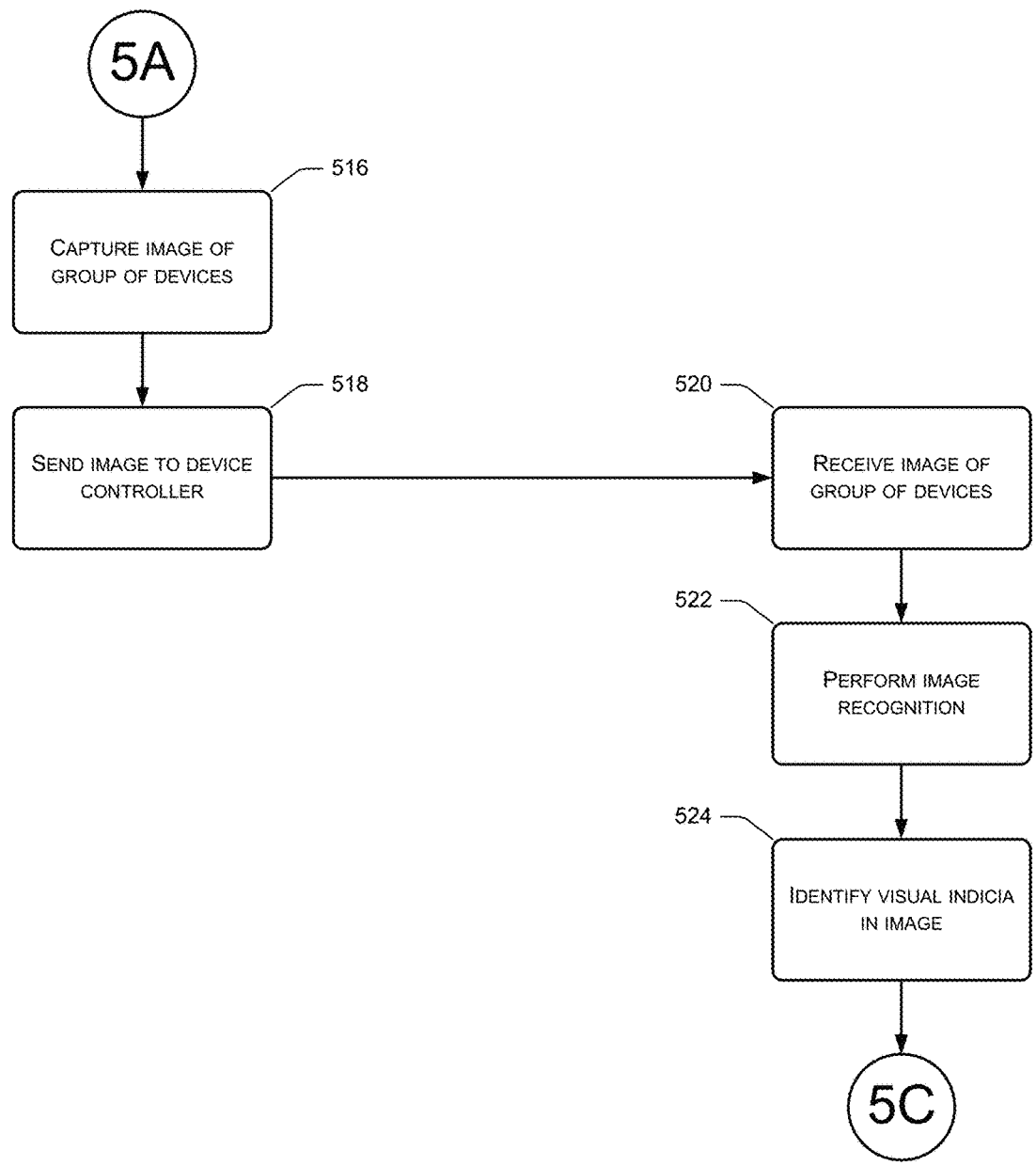
Figure 5C:
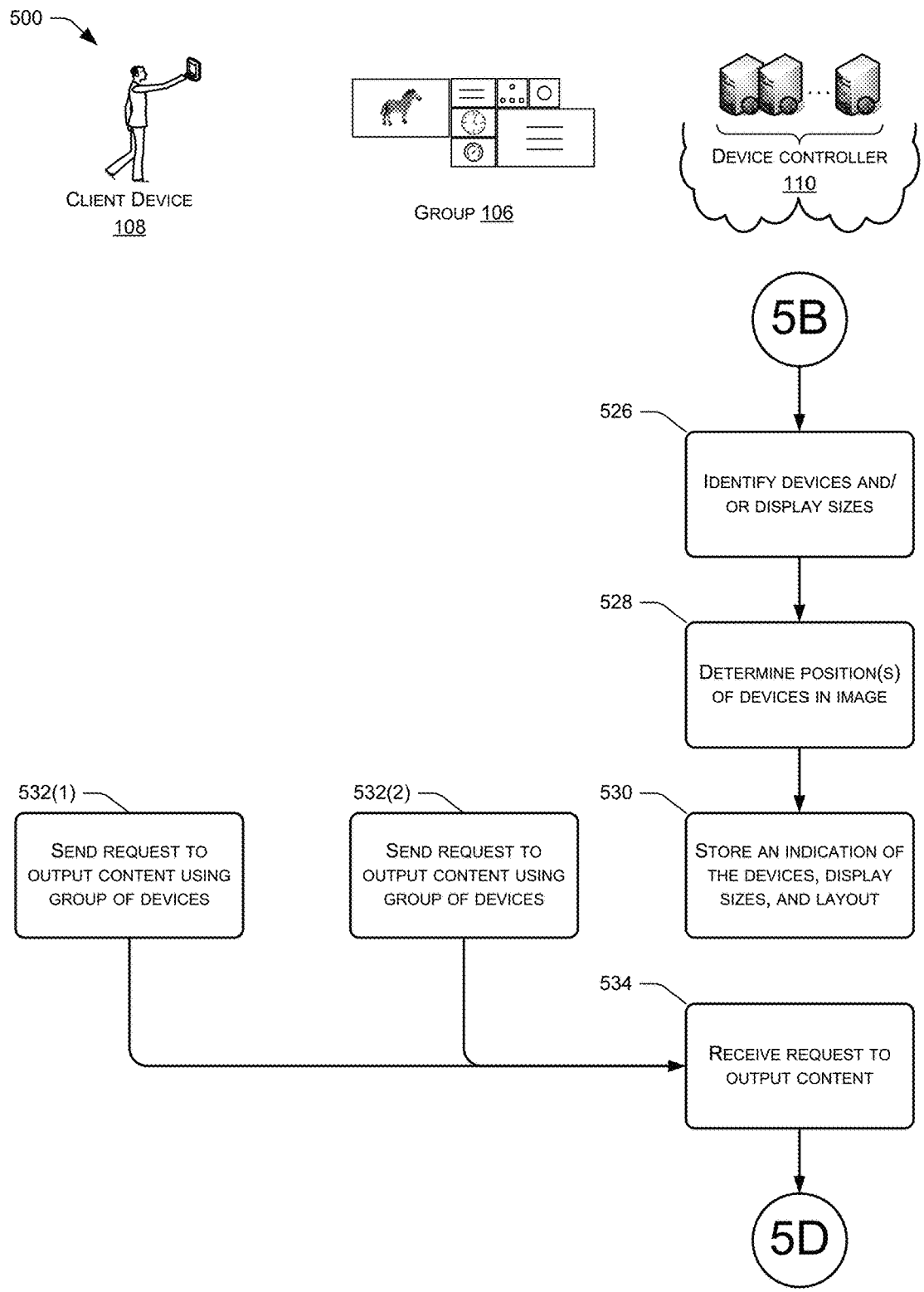

FIG. 5B continues the illustration of the process 500 and includes, at 516, the client device 108 capturing an image of the group of the devices that the user 104 desires to configure. At 518, the client device 108 sends the image to the device controller 120, which receives the image at 520. At 522, the device controller 120 performs image recognition on the image and, at 524, identifies one or more of the visual indicia. That is, the device controller 120 may identify those ones of the visual indicia that are presented by devices that are depicted within the image.

FIG. 5B continues the illustration of the process 500 and includes, at 526, identifying devices within the group based on the visual indicia, as well as determining sizes of these devices. For instance, the device controller 120 may map each unique visual indicia to the device that the device controller 120 requested present that particular indicia. At 528, the device controller 120 determines respective positions of the devices within the image using image recognition. At 530, the device controller 120 stores an indication of the devices that make up the group, an indication of their display sizes, and an indication of the layout of the group.

Sometime after storing the information regarding the group, the client device 108, a device of the group 106, or another device may send a request to output content with the environment as illustrated at 532(1) and 532(2). For instance, at 532(1), the user may use the companion application 118 to request to present certain content with the environment. Additionally or alternatively, the user may utilize one of the devices of the group 106 (e.g., the voice-controlled device 106(6)) to send the request. In either instance, the device controller may receive the request at 534.

Figure 5D:
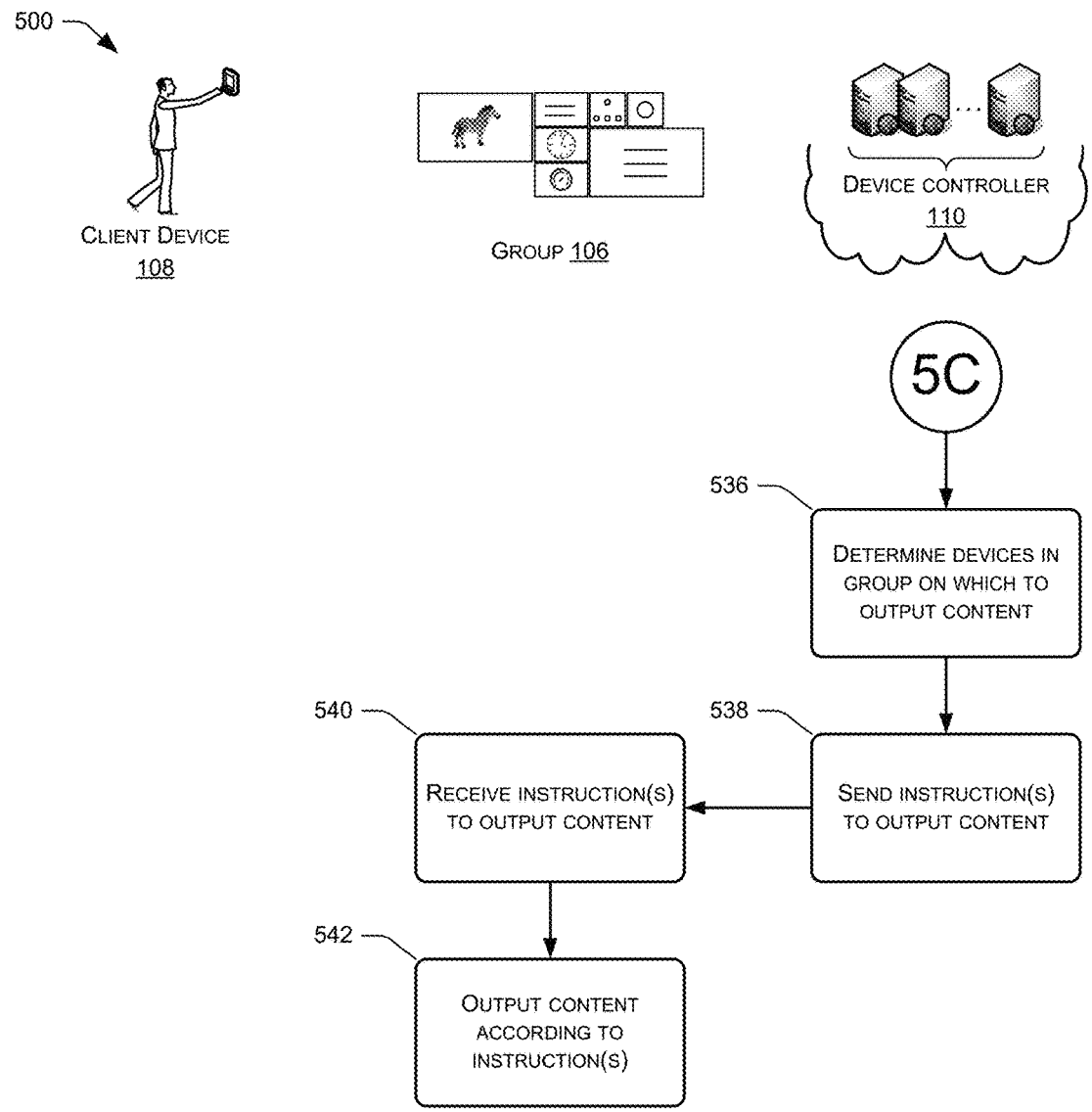

FIG. 5D concludes the illustration of the process 500 and includes, at 536, the device controller 120 determining which devices on which to output content on. For instance, if the requests specifies that visual content is to be outputted, the device controller 120 may send one or more instructions to the display devices to present the content. In some instances, the device controller may utilize multiple ones of the display devices a single display. For instance, the device controller 120 may utilize the display devices 106(1)-(3) as a single display and may send respective instructions to these devices to present corresponding portions of the content. If, however, the content comprises audible content, then the device controller 120 may determine which devices are capable of outputting the audible content. At 538, the device controller 120 sends the instruction(s), which the devices receive at 540. At 542, the respective devices of the group 106 output the respective content according to the instructions.

Figure 6A:
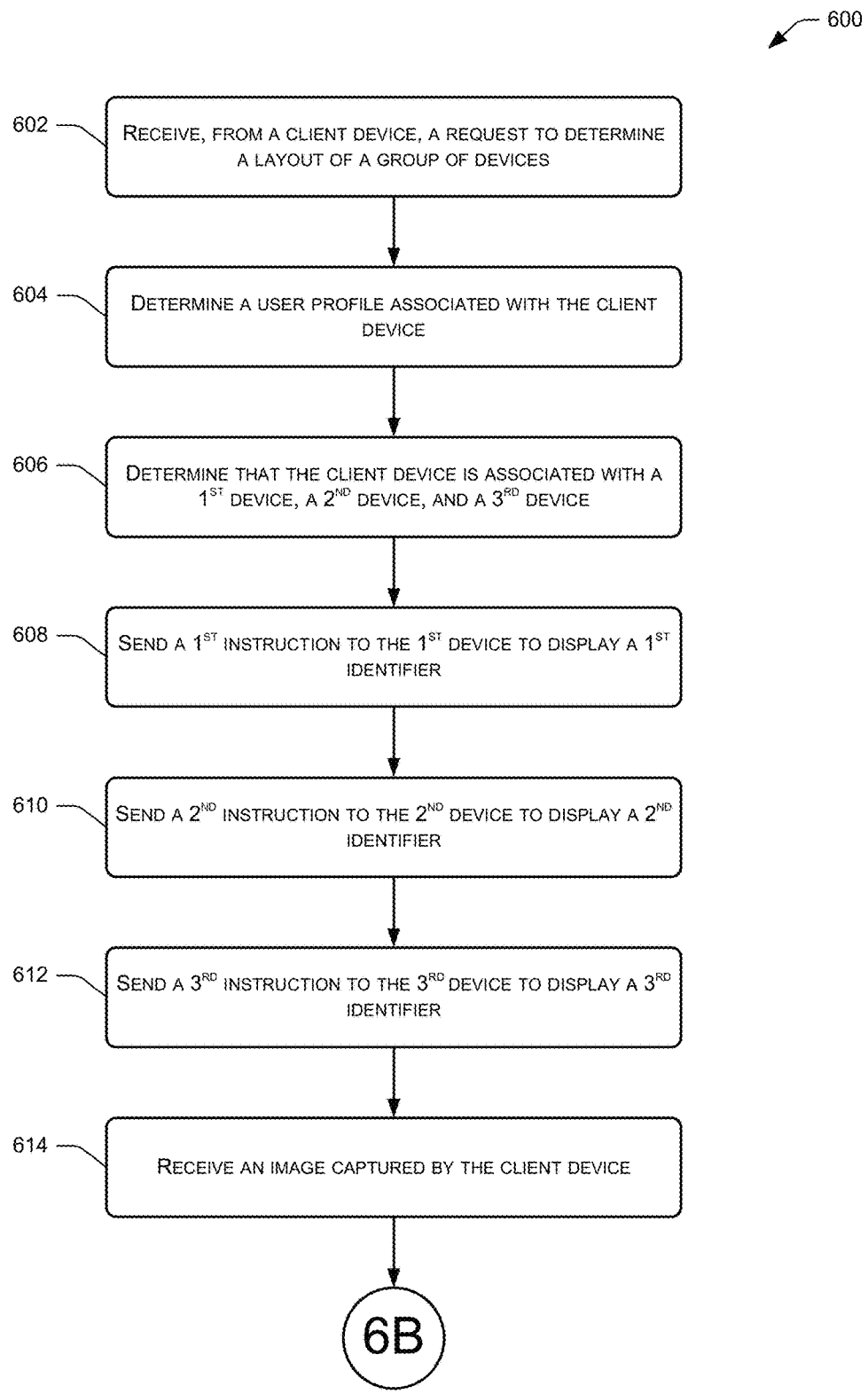
FIGS. 6A-B collectively illustrate an example flow diagram of another process for configuring a group of devices for use within an environment by determining the identity and layout of the devices within the group.
Figure 6B:
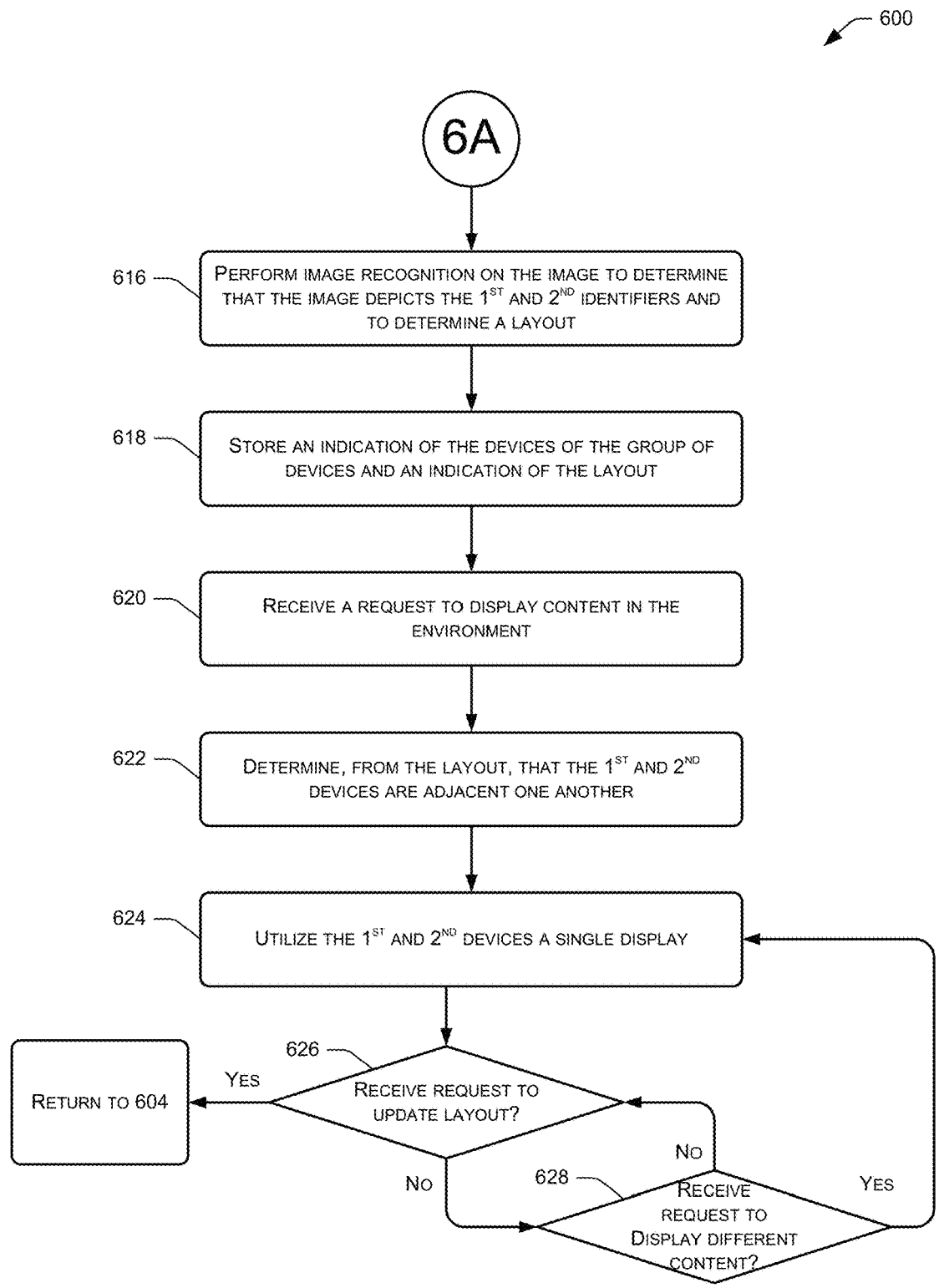

FIGS. 6A-B collectively illustrate an example flow diagram of another process 600 for configuring a group of devices for use within an environment by determining the identity and layout of the devices within the group. In some instances, the device controller 120 may perform some or all of the process 600.

At 602, the process 600 receives, from an application executing on a client device residing within an environment, a request to determine a layout of a group of display devices within the environment. At 604, the process 600 determines a user profile associated with the client device. At 606, the process determines that the user profile is associated with a first display device, a second display device, and a third display device. At 608-612, the process 600 sends a first instruction to the first display device to display a first identifier, a second instruction to the second display device to display a second identifier, and a third instruction to the third display device to display a third identifier. At 614, the process 600 receives an image captured by a camera of the client device.

FIG. 6B continues the illustration of the process 600 and includes, at 616, performing image recognition on the image to: (1) determine that the image depicts the first identifier and the second identifier but not the third identifier; (2) determine a first position of the first display device, and (3) determine a second position of the second display device relative to the first position. At 618, the process 600 stores: (1) a first indication that the group of display devices within the environment includes the first display device and the second display device, and (2) a second indication of the layout of the group of display devices, the layout specifying the first position of the first display device and the second position of the second display device relative to the first position.

Sometime thereafter, at 620 the process 600 receives a request to display content in the environment and, at 622, determines, based on the layout of the group of display devices, that the first and second display devices are adjacent one another. At 624, the process 600 utilizes the first and second display devices as a single display by sending a third instruction to first display device to display a first portion of the content and sending a fourth instruction to the second display device to display a second portion of the content.

At 626, the process 600 determines whether a request to update the layout has been received. For instance, if a user adds, removes, or moves a device of the group, the client device or one of the devices of the group may send a request to update the layout of the group. If such a request is received, then the process 600 may return to 604 to repeat the process and update the constituency and layout of the group. If no update request is received, however, then the process 600 may determine, at 628, whether the process 600 receives a request to display additional content. If so, then in this example the process 600 may again utilize the first and second devices as a single display.

Figure 7:
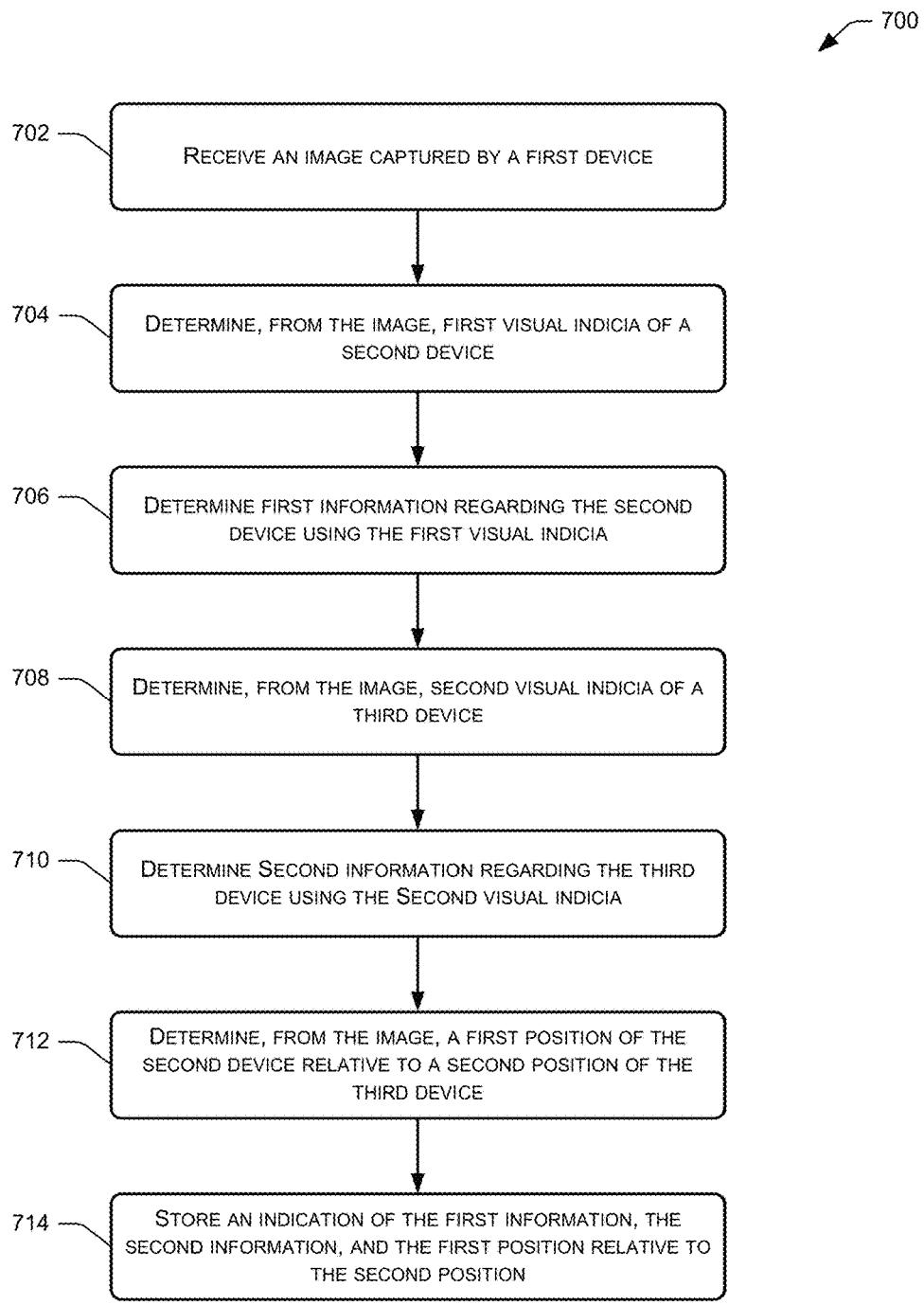
FIG. 7 illustrates an example flow diagram of yet another process for configuring a group of devices for use within an environment.

FIG. 7 illustrates an example flow diagram of yet another process 700 for configuring a group of devices for use within an environment. In some instances, the device controller 120 may perform some or all of the process 700. At 702, the process 700 receives an image captured by a first device within an environment, the image depicting a second device within the environment and a third device within the environment. At 704, the process 700 determines, from the image, first visual indicia of the second device and, at 706, determines first information regarding the second device using the first visual indicia. For instance, the process 700 may utilize the first visual indicia to determine an identity of the device, a display size of the device, a capability of the device, or the like. Similarly, at 708, the process 700 determines, from the image, second visual indicia of the third device and, at 710, determines second information regarding the third device using the second visual indicia.

At 712, the process determines, from the image, a first position of the second device relative to a second position of the third device. This may include determine a position of the second device within the image and then determine a position of the third device relative to this position of the second device within the image. At 714, the process 700 stores an indication of the first information, the second information, and the first position of the second device relative to the second position of the third device. Therefore, the second and third devices may later be used to output content within the environment based on the capabilities and layout of the devices.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
   sending, from one or more computing devices to a first device comprising a first display, a first instruction to display first visual indicia on the first display;
   sending, from the one or more computing devices to a second device comprising a second display, a second instruction to display second visual indicia on the second display;
   receiving, by the one or more computing devices, image data representing the first device within an environment and the second device within the environment;
   determining, by the one or more computing devices from the image data, a first position of the first device based at least in part on the first visual indicia;
   storing, by the one or more computing devices, the first position;
   determining, by the one or more computing devices, a second position of the second device based at least in part on the second visual indicia;
   storing, by the one or more computing devices, the second position of the second device;
   receiving a request to output multimedia content in a location of the environment;
   determining that the first device is associated with the location in the environment;
   determining that the second device is associated with the location in the environment;
   causing the first device to output first multimedia content; and
   causing the second device to output second multimedia content.

2. The method as recited in claim 1, further comprising:
   determining first information regarding the first device using at least the first visual indicia;
   determining second information regarding the second device using at least the second visual indicia;
   storing the first information; and
   storing the second information.

3. The method as recited in claim 1, wherein:
   the determining the first position comprises determining the first position of the first device relative to the second position of the second device; and
   the storing the first position comprises storing the first position of the first device relative to the second position of the second device.

4. The method as recited in claim 1, further comprising:
   determining at least one of a second make or a second model of the second device; and
   storing a second indication of the at least one of the second make or the second model of the second device.

5. The method as recited in claim 1, further comprising:
   determining at least one of a first display size or a first capability of the first device;
   storing a first indication of the at least one of the first display size or the first capability of the first device;
   determining at least one of a second display size or a second capability of the second device; and
   storing a second indication of the at least one of the second display size or the second capability of the second device.

6. The method as recited in claim 1, wherein the multimedia content includes visual content, and further comprising:
   receiving a request to output the visual content in the location in the environment;
   determining, based at least in part on the first position of the first device and the second position of the second device, that the first device and the second device are adjacent one another at the location in the environment, wherein determining that the first device is associated with the location comprises determining that the first device is in a specified room, and wherein determining that the second device is associated with the location comprises determining that the second device is in the specified room;
   sending a third instruction to the first device to display a first portion of the visual content based at least in part on the first device being associated with the location; and
   sending a fourth instruction to the second device to display a second portion of the visual content based at least in part on the second device being associated with the location.

7. The method as recited in claim 1, wherein the multimedia content includes audible content, and further comprising:
   receiving a request to output the audible content in the environment;
   determining that the first device is configured to output audio;
   determining that the second device is configured to output audio;
   determining a first portion of the audible content to output on the first device based at least in part on the first position of the first device;
   determining a second portion of the audible content to output on the second device based at least in part on the second position of the second device;
   sending a third instruction to the first device to output the first portion of the audible content; and sending a fourth instruction to the second device to output the second portion of the audible content.

8. The method as recited in claim 1, further comprising:
determining that the first device and the second device are adjacent one another at the location in the environment, wherein determining that the first device is associated with the location comprises determining that the first device is in a specified room, and wherein determining that the second device is associated with the location comprises determining that the second device is in the specified room;
determining that the first device and the second device collectively define a rectangular shape; and
storing a second indication that the first device and the second device may be used as a single display.

9. The method as recited in claim 1, wherein:
the determining the first visual indicia comprises determining at least one of a first shape, a first object, or a first pattern presented on the first display of the first device; and
the determining the second visual indicia comprises determining at least one of a second shape, a second object, or a second pattern presented on the second display of the second device.

10. The method as recited in claim 1, wherein:
the determining the first visual indicia comprises determining at least one of a first shape or a first perimeter of a first housing of the first device; and
the determining the second visual indicia comprises determining at least one of a second shape or a second perimeter of a second housing of the second device.

11. The method as recited in claim 1, further comprising:
receiving, from a client device in the environment, a request to determine a layout of a group of devices within the environment;
determining a user profile associated with the client device;
determining that the user profile is associated with the first device; and
determining that the user profile is associated with the second device.

12. A system comprising:
one or more processors; and
one or more computer-readable media storing computer-executable instructions that, when executed, cause the one or more processors to perform acts comprising:
sending, to a first device comprising a first display, a first instruction to display first visual indicia on the first display;
sending, to a second device comprising a second display, a second instruction to display second visual indicia on the second display;
receiving image data captured by an image device within an environment, the image data representing the first device within the environment and the second device within the environment;
determining, from the image data, a first position of the first device based at least in part on the first visual indicia;
storing the first position of the first device;
determining a second position of the second device based at least in part on the second visual indicia;
storing the second position of the second device;
receiving a request to output multimedia content in a location of the environment;
determining that the first device is associated with the location in the environment;
determining that the second device is associated with the location in the environment;
causing the first device to output first multimedia content; and
causing the second device to output second multimedia content.

13. The system as recited in claim 12, wherein the multimedia content includes visual content, and the acts further comprising:
receiving a request to output the visual content in the location in the environment;
determining, based at least in part on the first position of the first device and the second position of the second device, that the first device and the second device are adjacent one another at the location in the environment, wherein determining that the first device is associated with the location comprises determining that the first device is in a specified room, and wherein determining that the second device is associated with the location comprises determining that the second device is in the specified room;
sending a third instruction to the first device to display a first portion of the visual content; and
sending a fourth instruction to the second device to display a second portion of the visual content.

14. The system as recited in claim 12, wherein the multimedia content includes audible content, and the acts further comprising:
receiving a request to output the audible content in the environment;
determining that the first device is configured to output audio;
determining that the second device is configured to output audio;
determining a first portion of the audible content to output on the first device based at least in part on the first position of the first device;
determining a second portion of the audible content to output on the second device based at least in part on the second position of the second device;
sending a third instruction to the first device to output the first portion of the audible content; and
sending a fourth instruction to the second device to output the second portion of the audible content.

15. The system as recited in claim 12, the acts further comprising:
determining that the first device and the second device are adjacent one another at the location in the environment, wherein determining that the first device is associated with the location comprises determining that the first device is in a specified room, and wherein determining that the second device is associated with the location comprises determining that the second device is in the specified room;
determining that the first device and the second device collectively define a rectangular shape; and
storing a second indication that the first device and the second device may be used as a single display.

16. The system as recited in claim 12, the acts further comprising:
receiving, from a client device, a request to determine a layout of a group of devices within the environment;
determining a user profile associated with the client device;
determining that the user profile is associated with the first device; and determining that the user profile is associated with the second device.

17. One or more non-transitory computer-readable media storing computer-executable instructions that, when executed, cause one or more processors to perform acts comprising:
    receiving image data representing a first device comprising a first display within an environment and a second device comprising a second display within the environment;
    determining, from the image data, first visual indicia shown on the first display and associated with the first device;
    determining, from the image data, second visual indicia shown on the second display and associated with the second device;
    determining, from the image data, a first position of the first device;
    storing the first position of the first device;
    determining a second position of the second device;
    storing the second position of the second device;
    receiving a request to output multimedia content in a location of the environment;
    determining that the first device is associated with the location in the environment;
    determining that the second device is associated with the location in the environment;
    causing the first device to output first multimedia content; and
    causing the second device to output second multimedia content.

18. The one or more non-transitory computer-readable media as recited in claim 17, wherein the multimedia content includes visual content, and the acts further comprising:
    receiving a request to output the visual content in the environment;
    determining that the first device is configured to output the visual content;
    determining that the second device is configured to output the visual content;
    determining, based at least in part on the first position of the first device and the second position of the second device, that the first device and the second device are adjacent one another;
    sending a first instruction to the first device to display a first portion of the visual content; and
    sending a second instruction to the second device to display a second portion of the visual content.

19. The one or more non-transitory computer-readable media as recited in claim 17, the acts further comprising:
    sending, to the first device, a first instruction to display the first visual indicia on the first display; and
    sending, to the second device, a second instruction to display the second visual indicia on the second display.

20. The one or more non-transitory computer-readable media as recited in claim 17, wherein determining that the first device is associated with the location comprises determining that the first device is in a specified room, and wherein determining that the second device is associated with the location comprises determining that the second device is in the specified room.

* * * * *